(12) United States Patent
Nuriya et al.

(10) Patent No.: US 9,656,338 B2
(45) Date of Patent: May 23, 2017

(54) GEAR GRINDING UNIT (71) Applicant: NITOLEX CORPORATION, Chitagun, Aichi (JP)

(72) Inventors: Takahiko Nuriya, Handa (JP); Shoichi Morioka, Aichi (JP)

(73) Assignee: NITOLEX CORPORATION, Chitagun, Aichi (JP)

( * ) Notice: Subject to any disclaimer, the term of this patent is extended or adjusted under 35 U.S.C. 154(b) by 16 days.

(21) Appl. No.: 14/781,875

(22) PCT Filed: Jul. 7, 2014

(86) PCT No.: PCT/JP2014/068029
§ 371 (c)(1),
(2) Date: Oct. 1, 2015

(87) PCT Pub. No.: WO2015/005269
PCT Pub. Date: Jan. 15, 2015

(65) Prior Publication Data
US 2016/0059332 A1 Mar. 3, 2016

(30) Foreign Application Priority Data

Jul. 10, 2013 (JP) .................................. 2013-144442

(51) Int. Cl.
*B23F 21/02* (2006.01)
*B24D 13/02* (2006.01)

(52) U.S. Cl.
CPC ............ *B23F 21/026* (2013.01); *B23F 21/02* (2013.01); *B24D 13/02* (2013.01)

(58) Field of Classification Search
CPC ......... B23F 21/026; B23F 21/02; B24D 13/02
(Continued)

(56) References Cited

U.S. PATENT DOCUMENTS

| 5,142,829 A | 9/1992 | Germain |
| 5,197,998 A | 3/1993 | Germain |

(Continued)

FOREIGN PATENT DOCUMENTS

| CN | 1074848 A | 8/1993 |
| DE | 2743585 A1 | 3/1979 |

(Continued)

OTHER PUBLICATIONS

International Search Report (ISR) and Written Opinion (WO) dated Sep. 16, 2014 issued in International Application No. PCT/JP2014/068029.

Chinese Office Action (and English translation thereof) dated Aug. 1, 2016, issued in counterpart Chinese Application No. 201480024093.X.

(Continued)

*Primary Examiner* — Robert Rose
(74) *Attorney, Agent, or Firm* — Holtz, Holtz & Volek PC (57) ABSTRACT

A gear grinding unit, capable of grinding a tooth flank of a gear to have fine surface roughness without requiring any special shaping work such as dressing, includes a threaded grinding part which is rotatable around a rotation axis ($S_1$) and engages with a tooth of a gear to be ground. Through a rotational motion of the threaded grinding part, a tooth flank of the gear is ground. The threaded grinding part includes a plurality of flexible abrasive sheets each including a virtual circle having a diameter that equals a root diameter ($D_A$) of the threaded grinding part and a bulge part bulging radially outward from the virtual circle. With the bulge parts of the abrasive sheets mutually shifted around the rotation axis ($S_1$), the abrasive sheets are overlapped along the rotation axis ($S_1$) to form the threaded grinding part.

4 Claims, 12 Drawing Sheets (58) Field of Classification Search
USPC .................. 451/47, 547, 50, 5, 8, 9, 102
See application file for complete search history.

(56) References Cited

U.S. PATENT DOCUMENTS

| | | | |
|---|---|---|---|
| 5,379,554 A * | 1/1995 | Thurman | B23F 21/026 |
| | | | 451/177 |
| 5,542,875 A | 8/1996 | Ichiguchi et al. | |
| 5,643,068 A | 7/1997 | Ward | |
| 6,379,238 B1 | 4/2002 | Beechey et al. | |
| 9,498,833 B2 * | 11/2016 | Burri | B23F 17/006 |
| 2009/0227182 A1 * | 9/2009 | Breith | B23F 23/1225 |
| | | | 451/5 |
| 2014/0141699 A1 * | 5/2014 | Yanase | B23F 21/02 |
| | | | 451/47 |

FOREIGN PATENT DOCUMENTS

| | | |
|---|---|---|
| EP | 0649708 A1 | 4/1995 |
| JP | 01060868 U | 4/1989 |
| JP | 07027755 U | 5/1995 |
| JP | 07164331 A | 6/1995 |
| JP | 2013018117 A | 1/2013 |
| TW | 201302359 A | 1/2013 |
| WO | 2011111808 A1 | 9/2011 |

OTHER PUBLICATIONS

International Preliminary Report on Patentability (IPRP) including Written Opinion (in English) dated Jan. 21, 2016, issued in parent International Application No. PCT/JP2014/068029.
Extended European Search Report (EESR) dated Feb. 27, 2017 issued in counterpart European Application No. 14823286.1.

* cited by examiner

GEAR GRINDING UNIT

TECHNICAL FIELD

The present invention relates to a gear grinding unit which grinds a tooth flank of a gear by bringing a threaded grinding function part into contact with a gear tooth.

BACKGROUND ART

Recently, in the field of automobiles that places importance on comfortability and fuel efficiency, fine surface roughness of a gear used for a transmission or the like to achieve less noise, less vibration and lower fuel consumption has been increasingly demanded.

To achieve fine surface roughness of a gear, a conventional technique is such that the gear and a threaded grindstone are mutually rotated in engaging relation for generation grinding of a tooth flank of the gear (refer to, for example, Patent Document 1).

RELATED ART DOCUMENT

Patent Document

Patent Document 1: Japanese Patent Unexamined Publication No. 2013-018117

As an example of the threaded grindstone mentioned above, there has been proposed a grindstone which has a threaded grinding surface formed on a surface of a base metal throughout an axial direction of the base metal with a precise pitch and has, for example, electrodeposited CBN abrasive grains on the threaded grinding surface via a plating layer.

The above-described threaded grindstone, however, cannot be made with ease. In order to grind the tooth flank of the gear to have fine surface roughness, the above-described threaded grindstone itself must be shaped with high accuracy to match a tooth profile of the gear, thus problematically requiring advanced working technique.

Moreover, the threaded grindstone occasionally requires shaping work called dressing for maintaining fine surface roughness of a gear to be ground because the surface of the threaded grindstone is shaved off with use, thereby requiring a machine exclusively for dressing. In addition, not only does time for the grinding work need to be spared, but time for the dressing work also needs to be spared. Thus, the incidental equipment problematically increases, and production efficiency problematically decreases.

SUMMARY OF THE INVENTION

Problems to be Solved by the Invention

In view of the problems discussed above, the present invention aims to provide a gear grinding unit which can be made with ease and can grind a tooth flank of a gear to have fine surface roughness without requiring any special shaping work such as dressing.

Means for Solving the Problems

To achieve the above object, a gear grinding unit according to the present invention comprises:

a threaded grinding part that is rotatable around a rotation axis and engages with a tooth of a gear to be ground, wherein a tooth flank of the gear is ground through a rotational motion of the threaded grinding part, the gear grinding unit further comprising:

a plurality of flexible abrasive sheets each including a bulge part bulging radially outward from a virtual circle whose diameter equals a root diameter of the threaded grinding part, wherein the threaded grinding part is formed by overlapping the abrasive sheets along the rotation axis with the bulge parts mutually shifted around the rotation axis (First Invention).

In the present invention, it is preferable that each of the abrasive sheets further include a backing including a curved part outlining the bulge part, and an abrasive layer be provided only in the vicinity of the curved part on a surface of the backing so as to contact the tooth flank of the gear (Second Invention).

In the present invention, it is preferable that a spacer be interposed between adjacent abrasive sheets of the plurality of the abrasive sheets for providing a predetermined space (Third Invention).

Advantages of the Invention

In the gear grinding unit of the first invention, the threaded grinding part is formed by overlapping the plurality of flexible abrasive sheets along the rotation axis with the bulge parts of the abrasive sheets mutually shifted around the rotation axis, so that when the threaded grinding part is pressed against the gear tooth, the abrasive sheets bend according to the profile of the tooth, thereby allowing the threaded grinding part to be in close contact with the tooth flank. Accordingly, the tooth flank can be ground uniformly and is not subjected to localized grinding. As a result, the tooth flank can be ground so as to have fine surface roughness. Moreover, the threaded grinding part does not require high-precision shaping so as to fit the profile of the gear tooth and can thus be made with ease.

Furthermore, the bending abrasive sheets exert their restoring force for returning to their respective original positions, so that the abrasive sheets are always pressed against the tooth flank. For this reason, even if the abrasive sheets wear away with use, the abrasive sheets can maintain their contact with the tooth flank, thereby eliminating the need for special shaping work such as dressing that a threaded grindstone requires.

In the gear grinding unit of the second aspect of the invention, the abrasive layer is provided only in the vicinity of the curved part on the surface of the backing of each of the abrasive sheets to be able to contact the tooth flank of the gear. Providing abrasive only to a part of each abrasive sheet that substantially comes into contact with the tooth flank allows the abrasive sheet to have a required grinding function and can reduce consumption of the abrasive or the like by a substantial amount.

Since the abrasive layer is not provided to a part other than in the vicinity of the curved part of the backing of the abrasive sheet, the abrasive sheet bends more flexibly than the abrasive sheet having the abrasive layer on the entire surface of the backing, thereby allowing the threaded grinding part to contact the tooth flank more closely. Thus, finer surface roughness can be obtained.

Moreover, centrifugal force associated with the rotational motion of the threaded grinding part can effectively act on the abrasive sheets, thereby causing the bending abrasive sheets to rise so as to return to their respective original positions. In this way, the abrasive sheets can be pressed against the tooth flank. Pressing force of the abrasive sheets with respect to the tooth flank can be adjusted by adjusting the centrifugal force, that is to say, adjusting rotational speed of the threaded grinding part.

In the gear grinding unit of the third aspect of the invention, the spacer is interposed between the adjacent abrasive sheets of the plurality of the abrasive sheets for providing the predetermined space, so that the degree of bending of the abrasive sheets can be adjusted with ease by adjusting spacer thickness, spacer diameter, the number of spacers and others.

BRIEF DESCRIPTION OF THE DRAWINGS

FIG. 1 (*a*) and FIG. 1 (*b*) are structural illustrations of an essential part of a gear grinding device using a gear grinding unit in accordance with a first exemplary embodiment of the present invention, with FIG. 1 (*a*) being a front view showing the gear grinding unit and a gear in an engaging condition and FIG. 1 (*b*) being a sectional view taken along line A-A in FIG. 1 (*a*).

FIG. 4 (*a*), FIG. 4 (*b*) and FIG. 4 (*c*) illustrate one abrasive sheet of the gear grinding unit in accordance with the first embodiment, with FIG. 4 (*a*) being a front view, FIG. 4 (*b*) being a side view and FIG. 4 (*c*) being a rear view of the abrasive sheet.

FIG. 5 (*a*), FIG. 5 (*b*) and FIG. 5 (*c*) illustrate another abrasive sheet of the gear grinding unit in accordance with the first embodiment, with FIG. 5 (*a*) being a front view, FIG. 5 (*b*) being a side view and FIG. 5 (*c*) being a rear view of the abrasive sheet.

FIG. 6 (*a*) is an enlarged view of part C in FIG. 2, and FIG. 6 (*b*) is an enlarged view of part E in FIG. 6 (*a*).

FIG. 7 (*a*), FIG. 7 (*b*) and FIG. 7 (*c*) illustrate a process of forming grinding lines in a cross-hatching pattern.

FIG. 8 (*a*), FIG. 8 (*b*) and FIG. 8 (*c*) illustrate an abrasive sheet of a gear grinding unit in accordance with a second exemplary embodiment of the present invention, with FIG. 8 (*a*) being a front view, FIG. 8 (*b*) being a side view and FIG. 8 (*c*) being a rear view of the abrasive sheet.

FIG. 9 (*a*) is an enlarged view of an essential part showing the gear grinding unit and the gear in an engaging condition, and FIG. 9 (*b*) is an enlarged view of part F in FIG. 9 (*a*).

FIG. 11 (*a*) is a front view of an abrasive sheet when the number of threads of a threaded grinding part is three, and FIG. 11 (*b*) is a front view of an abrasive sheet when the number of threads of a threaded grinding part is four.

FIG. 12 (*a*), FIG. 12 (*b*) and FIG. 12 (*c*) illustrate an example of abrasive sheet positioning means, with FIG. 12 (*a*) being a front view, FIG. 12 (*b*) being a side view and FIG. 12 (*c*) being a rear view of an abrasive sheet.

DETAILED DESCRIPTION OF PREFERRED EMBODIMENTS

Concrete exemplary embodiments of a gear grinding unit according to the present invention are demonstrated hereinafter with reference to the accompanying drawings.

First Exemplary Embodiment

Description of a Gear Grinding Device

Figure 1:
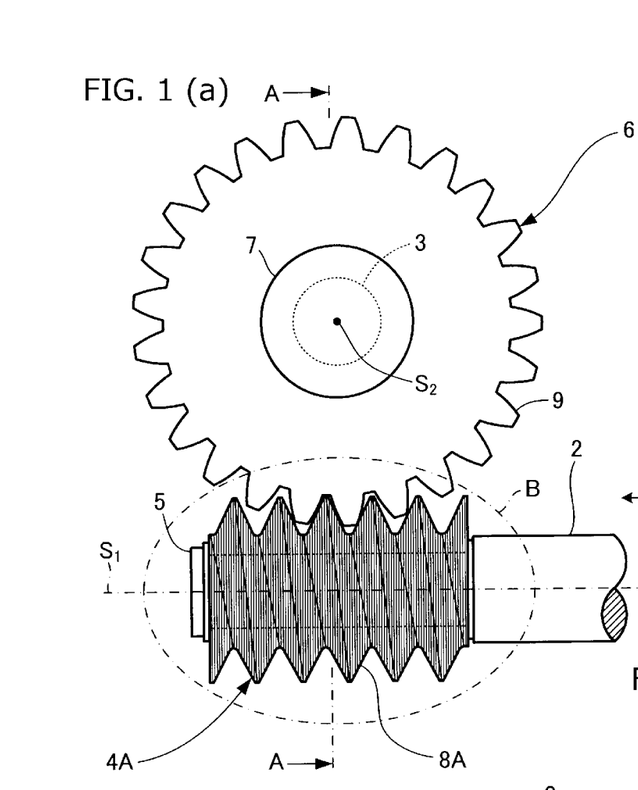

A gear grinding device 1 shown in FIGS. 1 (*a*) and 1 (*b*) is equipped with, in a three-axis control system formed of an X axis, a Y axis and a Z axis which are orthogonal to one another, a main spindle 2 rotatively driven around a rotation axis $S_1$ extending along the X axis, and a table shaft 3 rotatively driven around a rotation axis $S_2$. The rotation axis $S_2$ is positioned at a predetermined distance from the rotation axis $S_1$ along the Y axis orthogonal to the X axis to be perpendicular to the rotation axis $S_1$ and extends along the Z axis.

The main spindle 2 is movable along the X, Y and Z axes.

The main spindle 2 is mounted with a detachable worm-shaped gear grinding unit 4A. It is to be noted that reference mark 5 denotes a fastener for holding the gear grinding unit 4A firmly on the main spindle 2.

As the main spindle 2 is rotatively driven, the gear grinding unit 4A rotates around the rotation axis $S_1$ together with the main spindle 2.

The table shaft 3 is mounted with a detachable external gear 6 which is an object to be ground. It is to be noted that reference mark 7 denotes a fastener for holding the gear 6 firmly on the table shaft 3.

As the table shaft 3 is rotatively driven, the gear 6 rotates around the rotation axis $S_2$ together with the table shaft 3.

The gear grinding device 1 changes a position of an engagement between the gear grinding unit 4A and the gear 6 for grinding the gear 6 by synchronizing rotational driving of the main spindle 2 with rotational driving of the table shaft 3 and moving the main spindle 2 along each of the axes.

(Description of the Gear Grinding Unit)

Figure 2:
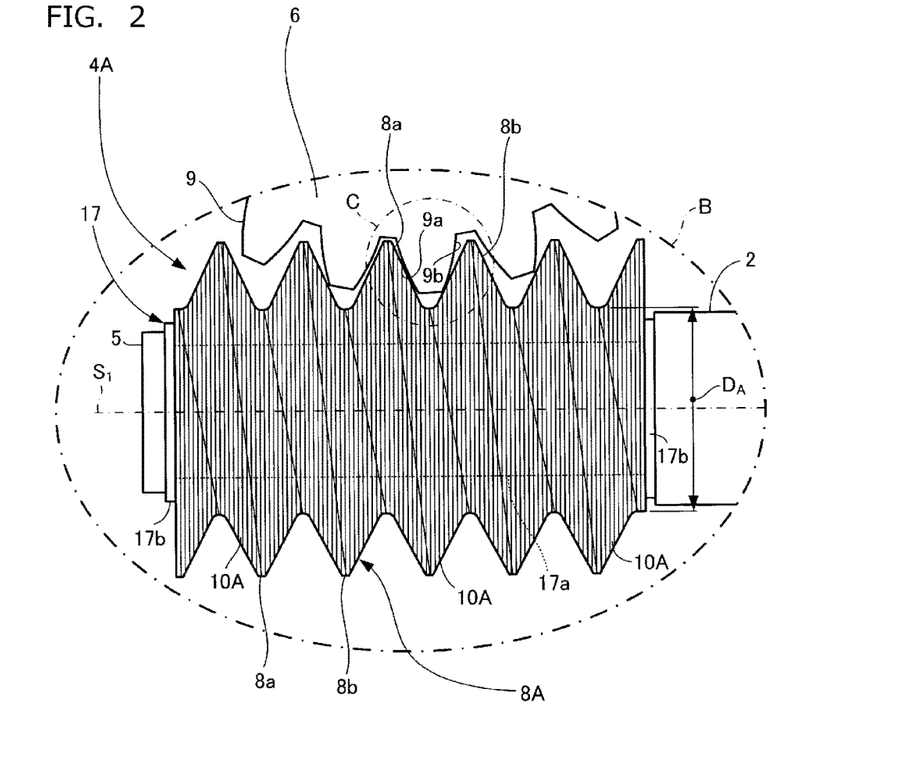
FIG. 2 is an enlarged view of part B in FIG. 1 (*a*).

As shown in FIG. 2, the gear grinding unit 4A has such a threaded grinding part 8A as to form two threads 8*a*, 8*b* running along two parallel, virtual spiral curves (not shown), respectively.

The threaded grinding part 8A has such dimensions as to be able to engage with a tooth 9 of the gear 6. While engaging with the tooth 9 of the gear 6, the threaded grinding part 8A is rotated around the rotation axis $S_1$, thereby grinding a tooth flank 9*a* of the gear 6.

Figure 3:
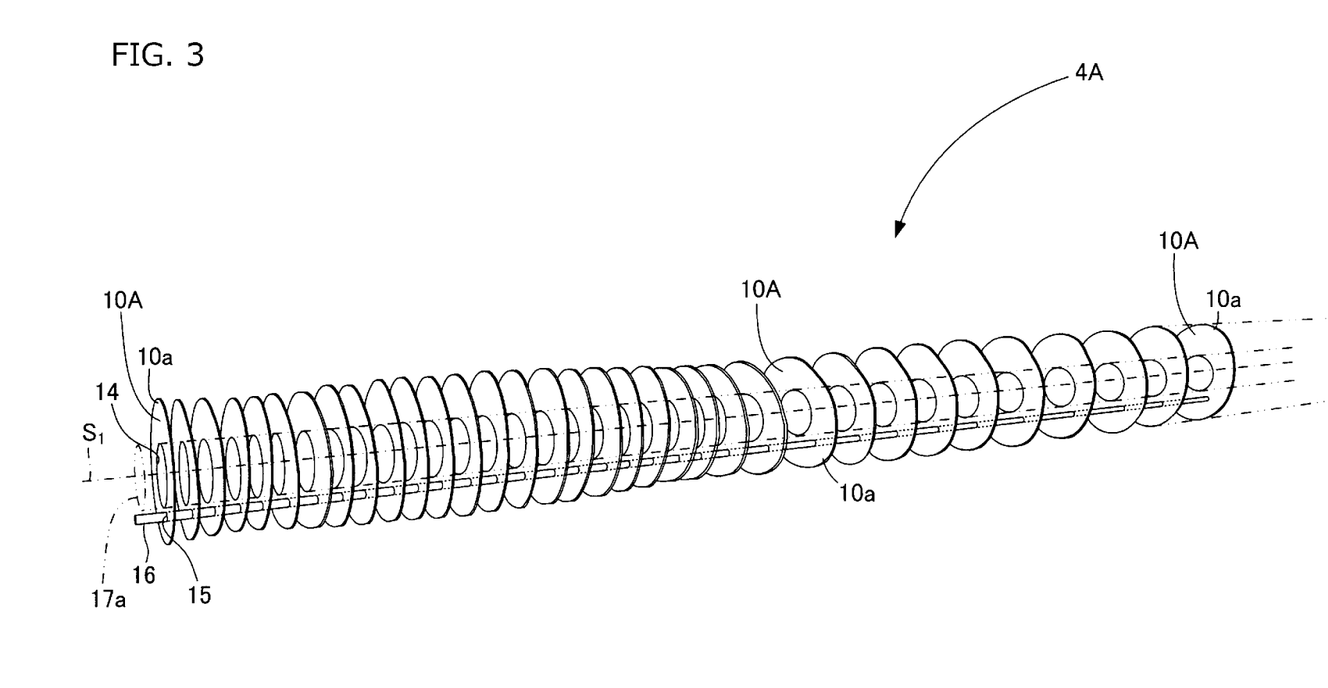
FIG. 3 is an exploded perspective view of the gear grinding unit in accordance with the first embodiment.

As shown in FIG. 3, the gear grinding unit 4A includes a plurality of flexible abrasive sheets 10A arranged along the rotation axis $S_1$ with their respective rotation centers aligned. These abrasive sheets 10A are overlapped along the rotation axis $S_1$ to form the threaded grinding unit 4A.

(Description of the Abrasive Sheets)

Figure 4:
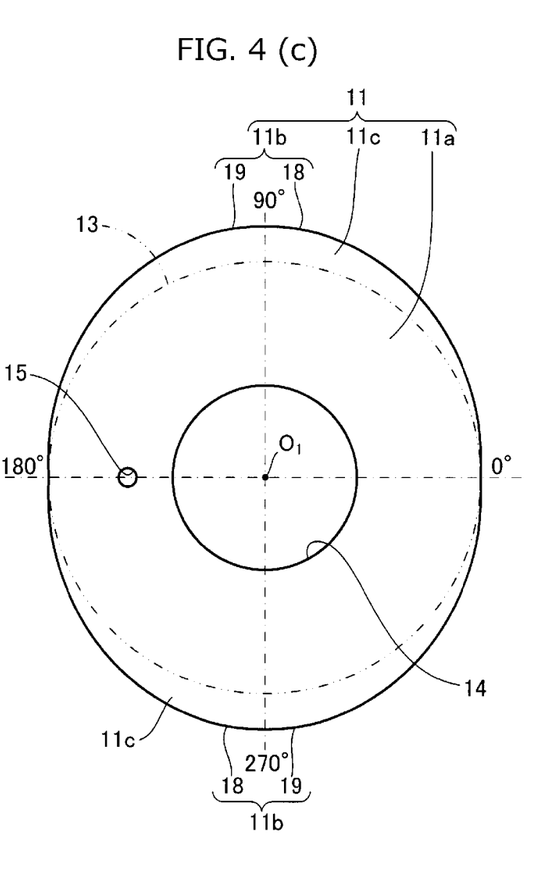

As shown in FIGS. 4 (*a*) to 4 (*c*), each abrasive sheet 10A is formed of a backing 11 that constitutes a base of the sheet 10A, and an abrasive layer 12 provided on an entire surface of one side (the left side in FIG. 4 (*b*)) of the backing 11. It is to be noted here that the abrasive layer 12 is formed by applying an abrasive to the backing 11 via an adhesive layer.

As shown in FIG. 4 (*a*), the abrasive sheet 10A includes bulge parts 10*a* each bulging radially outward from a virtual circle 13 whose diameter equals a root diameter $D_A$ of the threaded grinding part 8A (refer to FIG. 2).

The number of the bulge parts 10*a* provided for the abrasive sheet 10A corresponds to the number of threads of the threaded grinding part 8A. In this embodiment, the number of the threads is two, so that two bulge parts 10*a* are provided. These bulge parts 10*a* are circumferentially evenly spaced (every 180 degrees in this case) having the center point $O_1$ as their center through which the rotation axis $S_1$ passes.

As shown in FIGS. 4 (*a*) and 4 (*c*), the abrasive sheet 10A has an insertion hole 14 having the center point $O_1$ as its center.

Figure 5:
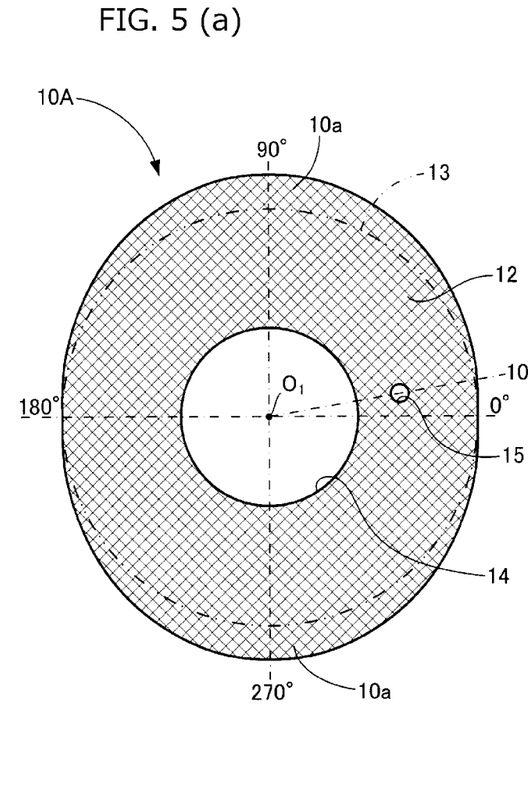

To position the plurality of the abrasive sheets 10A with the bulge parts 10*a* of the sheets 10A mutually shifted by a predetermined angle around the rotation axis $S_1$, one of the abrasive sheets 10A has a positioning hole 15 at an angle of, for example, 0 degrees with the center point $O_1$ being as its center (refer to FIG. 4 (*a*)), while another abrasive sheet 10A has the positioning hole 15 at an angle of, for example, 10 degrees with the center point $O_1$ being as its center (refer to FIG. 5 (*a*)). In such a way, with the center point $O_1$ being as their center, the plurality of the abrasive sheets 10A have respective positioning holes 15 at the different predetermined angular positions, respectively.

As shown in FIG. 3, the plurality of the abrasive sheets 10A of the gear grinding unit 4A are arranged with their rotation centers aligned along the rotation axis $S_1$ in order of decreasing or increasing angle at which the positioning hole 15 of each abrasive sheet 10A is positioned, and a positioning shaft 16 is inserted to pass through the respective positioning holes 15 of the abrasive sheets 10A, whereby the abrasive sheets 10A can be overlapped along the rotation axis $S_1$ with their bulge parts 10*a* positioned to be mutually shifted by the predetermined angle around the rotation axis $S_1$.

The plurality of the abrasive sheets 10A thus positioned by the positioning shaft 16 are fixed in place by a holder 17, or more specifically, by passing a hollow shaft 17*a* of the holder 17 (refer to FIG. 2) through the respective insertion holes 14 of the abrasive sheets 10A and holding the sheets 10A collectively from both sides by means of flanges 17*b* provided at respective ends of the hollow shaft 17*a*.

As shown in FIG. 4 (*c*), the backing 11 includes a main body 11*a* which is an inner part of the virtual circle 13 having the center point $O_1$ as its center, curved parts 11*b* outlining the respective bulge parts 10*a*, and crescent-shaped parts 11*c*, each of which is formed between the main body 11*a* and the curved part 11*b*.

Here, each of the curved parts 11*b* comprises a first curved part 18 that is in a first predetermined angle region around the center point $O_1$ (between 0 degrees and 90 degrees and between 180 degrees and 270 degrees, see FIG. 4 (*c*)) and a second curved part 19 that is in a second predetermined angle region around the center point $O_1$ (between 90 degrees and 180 degrees and between 270 degrees and 360 degrees, see FIG. 4 (*c*)). In the first predetermined angle region, the distance from the center point $O_1$ to the first curved part 18 increases as an angle around the center point $O_1$ increases, and in the second predetermined angle region, the distance from the center point $O_1$ to the second curved part 19 decreases as an angle around the center point $O_1$ increases. Therefore, the curved part 11*b* is a combination of parts of the spiral curve.

The backing 11 may be appropriately selected from flexible sheet materials such as cotton cloth, synthetic fiber cloth, kraft paper, nonwoven fabric cloth, metal mesh and a synthetic resin sheet.

The abrasive (abrasive grains) provided to the backing 11 comprises one or more abrasive materials selected from, for example, diamond, CBN (cubic boron nitride), $B_4C$, $Al_2O_3$, $SiO_2$ and SiC.

The adhesive layer used for providing adhesion between the backing 11 and the abrasive comprises a binder for binding the abrasive materials together, and an adhesive for bonding the abrasive to the backing.

The binder used for binding the abrasive materials together may be appropriately selected from commonly used metal, electrodeposition, vitrification, resin and others.

Glue and synthetic resin etc. may be used as the adhesive for bonding the abrasive to the backing. Main examples of the synthetic resin to be used are polyimide resin, phenol resin and epoxy resin. It is to be noted that there are cases where a filler such as calcium carbonate is combined.

(Description of Grinding Operation)

A description is provided hereinafter of grinding operation on the gear 6 that is performed by the gear grinding device 1 using the gear grinding unit 4A having the above-described structure.

As shown in FIGS. 1 (*a*) and 1 (*b*), the position of the main spindle 2 along the X, Y and Z axes is controlled first to move the threaded grinding part 8A of the gear grinding unit 4A into engagement with the tooth 9 of the gear 6.

Next, the main spindle 2 and the table shaft 3 are rotatively driven in synchronization with each other such that the threaded grinding part 8A is pressed against the tooth flank 9*a*.

Figure 6:
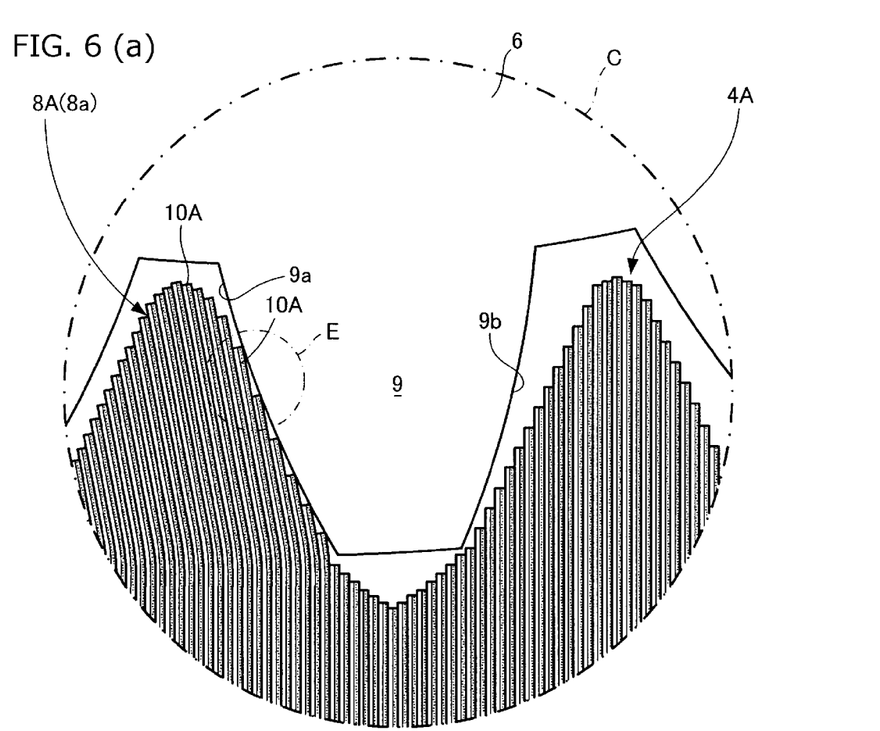

As shown in FIGS. 2 and 3, the threaded grinding part 8A of the gear grinding unit 4A is formed by overlapping the plurality of the flexible abrasive sheets 10A along the rotation axis $S_1$, with their bulge parts 10*a* mutually shifted by the predetermined angle around the rotation axis $S_1$, so that when the threaded grinding part 8A is pressed against the tooth 9 of the gear 6, as shown in FIGS. 6 (*a*) and 6 (*b*), the abrasive sheets 10A bend according to the profile of the tooth 9, thereby allowing a thread 8*a* of the threaded grinding part 8A to be in close contact with the tooth flank 9*a*.

In the gear grinding unit 4A of this embodiment, the abrasive sheets 10 bend to allow the thread 8*a* of the threaded grinding part 8A to come into close contact with the tooth flank 9*a*, so that the tooth flank 9*a* can be ground uniformly and localized grinding can be avoided. As a result, the tooth flank 9*a* can be ground with finer surface roughness. Moreover, the threaded grinding part 8A can be made with ease by overlapping the plurality of the abrasive sheets 10 in the manner described above, thereby eliminating the need for high-precision shaping so as to fit the profile of the tooth 9 of the gear 6.

The bending abrasive sheets 10 exert their restoring force for returning to their respective original positions, so that the abrasive sheets 10 are always pressed against the tooth flank 9*a*. For this reason, even if the abrasive sheets 10 wear away with use, the sheets 10 can maintain their contact with the tooth flank 9*a*, thereby eliminating the need for special shaping work such as dressing that a conventional threaded grindstone requires.

In the conventional threaded grindstone, a threaded grinding part has an increased diameter to relatively reduce the influence of its wear associated with grinding, whereas in the gear grinding unit 4A of the present embodiment, the influence of the wear of the threaded grinding part 8A that is associated with the grinding is offset by the above-mentioned restoring force of the abrasive sheets 10, so that the threaded grinding part 8A can have a relatively small diameter.

Figure 7:
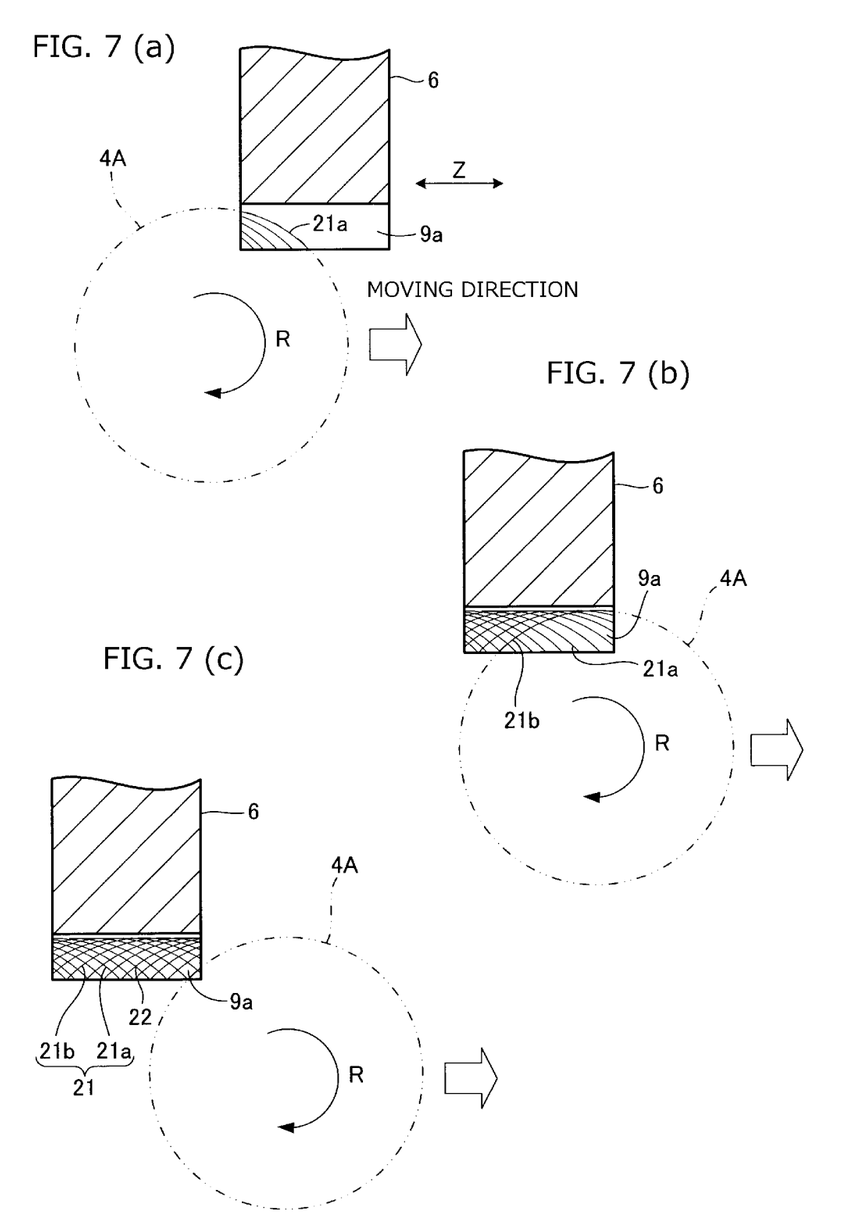

In such a feed operation of the gear grinding unit 4A along the Z axis in relation to the gear 6 as shown in FIGS. 7 (*a*) to 7 (*c*), when the gear grinding unit 4A moves along the tooth flank 9*a* of the gear 6 from left to right in the drawings, contact between a leading portion of the moving gear grinding unit 4A and the tooth flank 9a results in formation of, as shown in FIG. 7 (a), downward-sloping arc-shaped grinding lines 21a along rotating direction R of the gear grinding unit 4A on the tooth flank 9a, and contact between a following portion of the moving gear grinding unit 4A and the tooth flank 9a results in formation of, as shown in FIG. 7 (b), upward-sloping arc-shaped grinding lines 21b along rotating direction R of the gear grinding unit 4A on the previously formed downward-sloping grinding lines 21a on the tooth flank 9a.

In this way, the tooth flank 9a of the gear 6 is formed with, as shown in FIG. 7 (c), grinding lines 21 in a cross-hatching pattern in which two kinds of the arc-shaped grinding lines 21a, 21b of different directions cross each other. At an intersection of the arc-shaped grinding lines 21a, 21b of the grinding lines 21 having the cross-hatching pattern, an oil reserving part 22 is formed, and when the gear 6 is used in, for example, a transmission of an automobile, lubricating oil stored in this oil reserving part 22 can suppress wear of the tooth flank 9a more effectively.

Second Exemplary Embodiment

Figure 8:
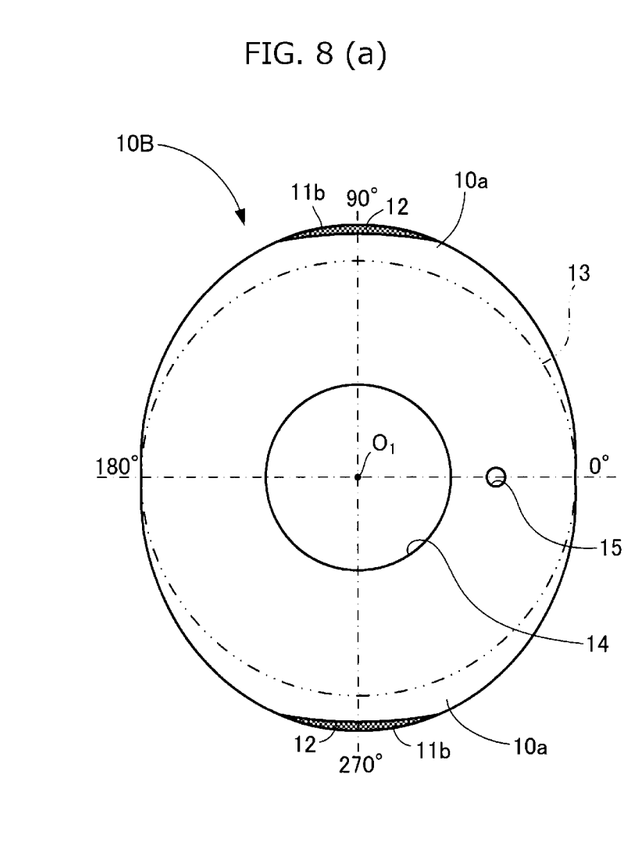
Figure 9:
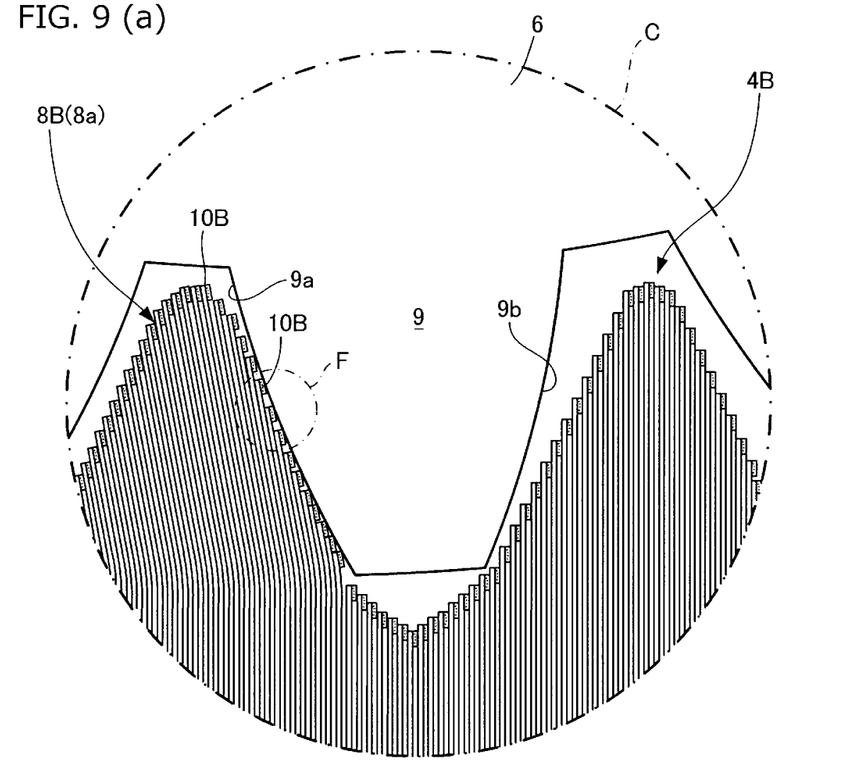

FIG. 8 (a), FIG. 8 (b) and FIG. 8 (c) illustrate an abrasive sheet of a gear grinding unit in accordance with the second exemplary embodiment of the present invention, with FIGS. 8 (a) to 8 (c) being a front view, a side view and a rear view of the abrasive sheet, respectively. FIG. 9 (a) is an enlarged view of an essential part showing the gear grinding unit of the second embodiment and a gear in an engaging condition, and FIG. 9 (b) is an enlarged view of part F in FIG. 9 (a).

It is to be noted that in the second embodiment, elements which are the same as or similar to those in the first embodiment have the same reference marks in the drawings, and the detailed descriptions of those elements are omitted. Emphasis is placed hereinafter on distinctive characteristic of the second embodiment, (and the same goes for a third exemplary embodiment which will be described later).

The abrasive sheet 10A of the first embodiment has, as shown in FIGS. 4 (a) to 4 (c), the abrasive layer 12 provided on the entire surface of one side (the left side in FIG. 4 (b)) of the backing 11, whereas an abrasive sheet 10B of the second embodiment has, as shown in FIGS. 8 (a) to 8 (c), a minimally required abrasive layer 12 provided only in the vicinity of the curved part 11b on a surface (the left surface in FIG. 8 (b)) of one side of the backing 11.

It goes without saying that gear grinding unit 4B of the second embodiment can obtain the same effects as the gear grinding unit 4A of the first embodiment. Moreover, since the minimally required abrasive layer 12 is provided only in the vicinity of the curved part 11b on the surface of the one side of the backing 11, the provided abrasive layer 12 corresponds only to a part of the abrasive sheet 10B that substantially comes into contact with the tooth flank 9a, whereby the abrasive sheet 10B can have a required grinding function, while consumption of abrasive or the like can be reduced by a substantial amount.

Since the abrasive layer 12 is not provided to a part other than in the vicinity of the curved part 11b of the backing 11 of the abrasive sheet 10B, the abrasive sheet 10B bends more flexibly than the abrasive sheet having the abrasive later 12 on the entire surface of the backing 11, thereby allowing the thread 8a of a threaded grinding part 8B to contact the tooth flank 9a more closely as shown in FIGS. 9 (a) and 9 (b). Consequently, finer surface roughness can be obtained.

Furthermore, centrifugal force associated with a rotational motion of the threaded grinding part 8B can effectively act on the abrasive sheet 10B, thereby causing the bending abrasive sheet 10B to rise so as to return to its original position. Thus, the abrasive sheet 10B can be pressed against the tooth flank 9a. Pressing force of the abrasive sheet 10B with respect to the tooth flank 9a can be adjusted by adjusting the centrifugal force, that is to say, adjusting rotational speed of the threaded grinding part 8B.

Third Exemplary Embodiment

Figure 10:
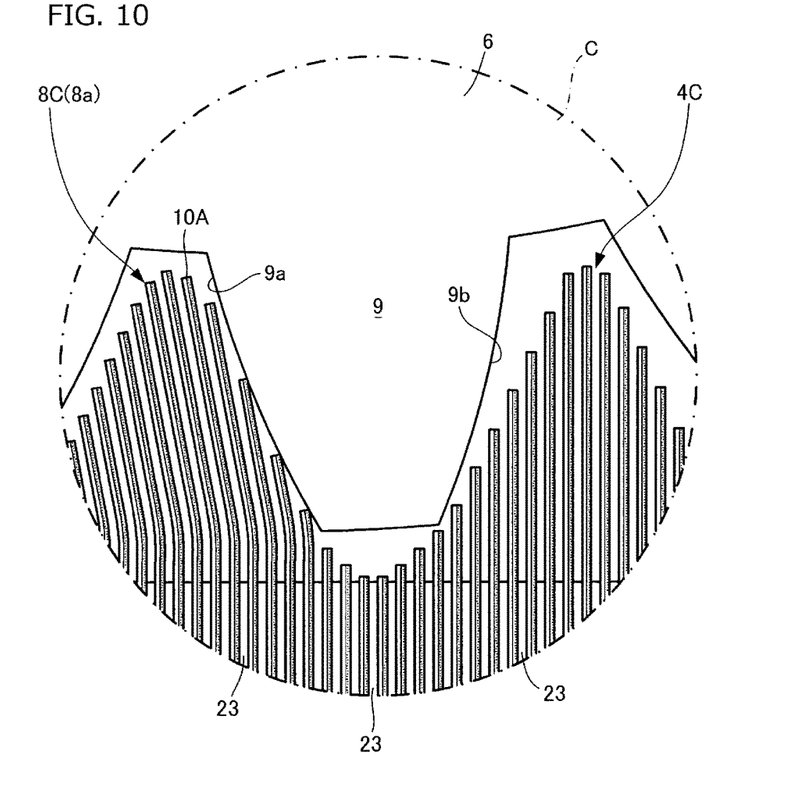
FIG. 10 is an enlarged view of an essential part showing a gear grinding unit in accordance with a third exemplary embodiment of the present invention and the gear in an engaging condition.

FIG. 10 is an enlarged view of an essential part showing a gear grinding unit of the third exemplary embodiment and a gear in an engaging condition.

In the gear grinding unit 4A of the first embodiment, the plurality of the abrasive sheets 10A are arranged close to one another as shown in FIG. 6 (a) and FIG. 6 (b), whereas in a plurality of the abrasive sheets 10A of a gear grinding unit 4C of the third embodiment, a spacer 23 is interposed between the adjacent abrasive sheets 10A for providing a predetermined space, and with the spacers 23 interposed, the plurality of the abrasive sheets 10A are overlapped along the rotation axis $S_1$, thus forming a threaded grinding part 8C.

It goes without saying that the gear grinding unit 4C of the third embodiment can obtain the same effects as the gear grinding unit 4A of the first embodiment. Moreover, the spacer 23 interposed between the adjacent abrasive sheets 10A of the plurality of the abrasive sheets 10A provides the predetermined space, so that the degree of bending of the abrasive sheets 10A can be adjusted with ease by adjusting thickness and diameter of the spacer 23, the number of the spacers 23 and others.

The embodiments of the gear grinding unit according to the present invention have been described above. However, the present invention is not limited to the structures described in the above embodiments and allows appropriate variations on each of the structures without departing from its spirit, such as, appropriately combining the structures of the foregoing embodiments.

Figure 11:
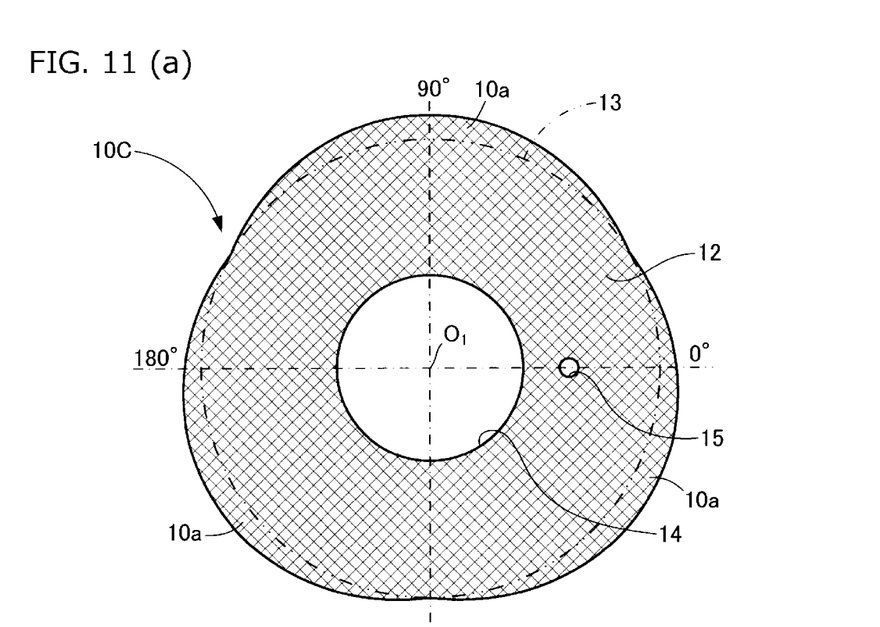

For example, when the number of the threads of the threaded grinding part 8A is three, the abrasive sheet 10C having, as shown in FIG. 11 (a), three bulge parts 10a which are circumferentially evenly spaced around the center point $O_1$ (every 120 degrees) may be used, and when the number of the threads is four, the abrasive sheet 10D having four bulge parts 10a which are circumferentially evenly spaced around the center point $O_1$ (every 90 degrees) as shown in FIG. 11 (b) may be used (the same goes for the threaded grinding parts 8B, 8C).

Figure 12:
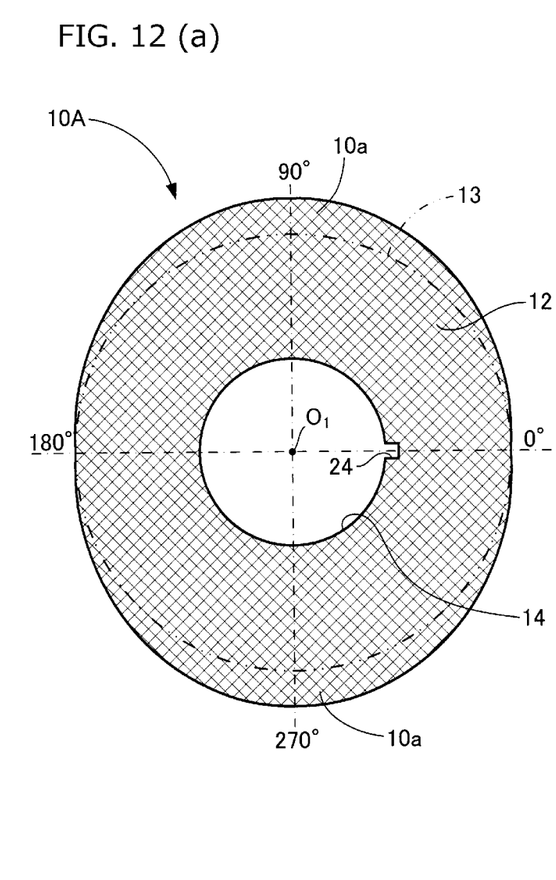

In place of the positioning hole 15 provided in the abrasive sheet 10A (refer to FIGS. 4 (a) and 4 (c)), a notch 24 may be provided at a periphery of the insertion hole 14 as shown in FIGS. 12 (a) and 12 (c), and the shaft 17a of the holder 17 may be provided with a projection (not shown) corresponding to this notch 24 for positioning the abrasive sheet 10A (and the same goes for abrasive sheets 10B, 10C and 10D).

Although the abrasive sheets 10A to 10D each have the abrasive layer 12 provided on the surface of the backing 11, the present invention is not limited to this. For example, a sheet of synthetic resin into which abrasive (abrasive grains) is kneaded may be used instead as the abrasive sheet 10A, 10B, 10C or 10D.

It is also to be noted that the curved part 11b of the backing 11 that outlines the bulge part 10a of each of the abrasive sheets 10A to 10D is not necessarily required to be a perfect curve and may instead be a series of many lines connected to shape into a curve as a whole.

With regard to the abrasive sheets 10A to 10D, the example in which the abrasive layer 12 is provided only to one side of the backing 11 has been shown. In such a case, however, in order to grind a tooth flank 9b on the opposite side, the gear grinding unit 4A, 4B or 4C needs to be temporarily disengaged from the gear 6, and thereafter mounting direction of the gear grinding unit 4A, 4B or 4C with respect to the main spindle 2 needs to be changed, or engagement position of the gear grinding unit 4A, 4B or 4C with respect to the gear 6 needs to be shifted.

For this reason, the other side of the backing 11 of the abrasive sheet 10A, 10B, 10C or 10D is also provided with the abrasive layer 12, that is to say, the both sides of the backing 11 have the abrasive layers 12, respectively. Thus, the tooth flank 9a on one side and the tooth flank 9b on the opposite side can both be ground in one chuck without disengagement of the gear grinding unit 4A, 4B or 4C from the gear 6, thereby improving work efficiency. To grind the tooth flank 9b that is on the opposite side of the tooth flank 9a on the one side, the main spindle 2 and the table shaft 3 are controlled in synchronization with each other so as to press the threads 8a, 8b of the threaded grinding part 8A, 8B or 8C against the tooth flank 9b.

INDUSTRIAL APPLICABILITY

A gear grinding unit according to the present invention is easy to make and has the characteristic of grinding a tooth flank of a gear to have fine surface roughness without requiring any special shaping work such as dressing and therefore, is suitable for achieving finer surface roughness of a gear used, for example, in a transmission or the like in the field of automobiles that places importance on comfortability and fuel efficiency.

DESCRIPTION OF REFERENCE MARKS IN THE DRAWINGS 1 gear grinding device
4A, 4B, 4C gear grinding unit
8A, 8B, 8C threaded grinding part
10A, 10B, 10C, 10D abrasive sheet
10a bulge part
11 backing
11b curved part
12 abrasive layer
13 virtual circle
23 spacer

The invention claimed is:

1. A gear grinding unit comprising:
   a threaded grinding part that is rotatable around a rotation axis and engages with a tooth of a gear to be ground, wherein a tooth flank of the gear is ground through a rotational motion of the threaded grinding part,
   the gear grinding unit further comprising:
      a plurality of flexible abrasive sheets each including a bulge part bulging radially outward from a virtual circle whose diameter equals a root diameter of the threaded grinding part,
   wherein the threaded grinding part is formed by overlapping the abrasive sheets along the rotation axis with the bulge parts mutually shifted around the rotation axis.

2. The gear grinding unit of claim 1, wherein each of the abrasive sheets further comprises a backing including a curved part outlining the bulge part, and an abrasive layer is provided only in the vicinity of the curved part on a surface of the backing to contact the tooth flank of the gear.

3. The gear grinding unit of claim 1, wherein a spacer is interposed between adjacent abrasive sheets of the plurality of the abrasive sheets for providing a predetermined space.

4. The gear grinding unit of claim 2, wherein a spacer is interposed between adjacent abrasive sheets of the plurality of the abrasive sheets for providing a predetermined space.

* * * * *